United States Patent
Gell, Jr.

[11] 4,180,954
[45] Jan. 1, 1980

[54] RADIATION CONTROLLING REVERSIBLE WINDOW

[76] Inventor: Harold A. Gell, Jr., 13720 Lockdale Rd., Silver Spring, Md. 20906

[21] Appl. No.: 895,055

[22] Filed: Apr. 10, 1978

[51] Int. Cl.² ............................ G02B 5/26; E06B 3/24
[52] U.S. Cl. ........................................ 52/171; 52/202; 52/823; 350/1.7; 428/433
[58] Field of Search ................. 52/171, 202, 788, 790, 52/823; 350/1.7; 428/433; 49/63

[56] References Cited

U.S. PATENT DOCUMENTS

| | | | |
|---|---|---|---|
| 3,122,797 | 3/1964 | Segre | 49/63 X |
| 3,202,054 | 8/1965 | Mochel | 52/171 X |
| 3,781,077 | 12/1973 | Groth | 350/1.7 |
| 3,920,413 | 11/1975 | Lowery | 126/270 X |
| 3,935,351 | 1/1976 | Franz | 428/34 |
| 3,977,930 | 8/1976 | Hunter | 428/440 X |
| 3,990,784 | 11/1976 | Gelber | 427/163 |
| 4,022,947 | 5/1977 | Grubb et al. | 350/1.7 X |
| 4,081,934 | 4/1978 | Franz | 52/171 |

FOREIGN PATENT DOCUMENTS 2631491 1/1978 Fed. Rep. of Germany ............ 52/171

*Primary Examiner*—Alfred C. Perham
*Attorney, Agent, or Firm*—Harold Gell

[57] ABSTRACT

A coated glass glazing system is presented including a transparent glass substrate having one surface coated with a radiation absorptive film which is overcoated with a radiation reflective film by a technique which renders the radiation reflective film radiation absorptive at the surface contacting the radiating absorptive film. The coated glass system is used as glazing for storm windows which are adapted to be reversible so that the radiation reflective surface may be exposed to the outside of the dwelling during the warm seasons to prevent excessive solar radiation from entering a dwelling and reversed during cold seasons to absorb solar radiation and utilize it to aid in keeping the dwelling interior warm.

9 Claims, 5 Drawing Figures

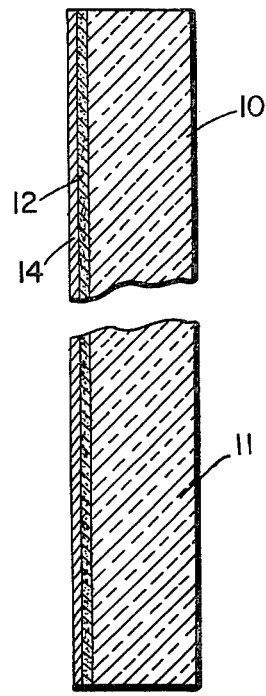
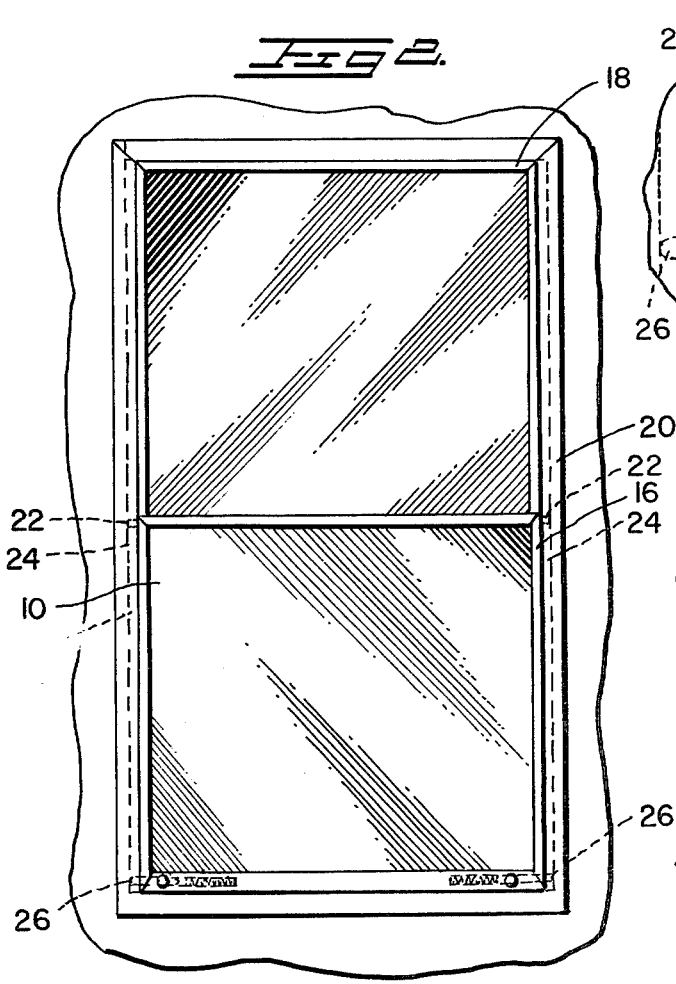
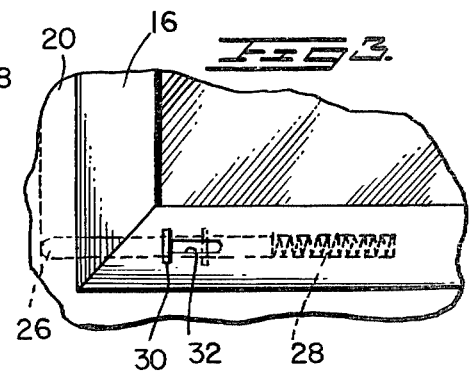
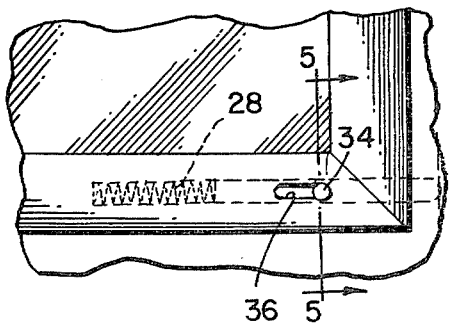
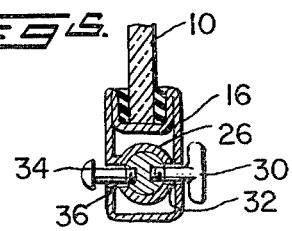

RADIATION CONTROLLING REVERSIBLE WINDOW

THE INVENTION

This invention relates to a means to provide windows for a structure which includes a reflective solar radiation barrier and an absorptive solar radiation collector adapted to permit the window to be utilized to reflect solar radiation in one orientation and to function as a radiation collector or heat absorber when reversed to a second orientation.

BACKGROUND OF THE INVENTION

Since the advent of windows in dwellings, man has been attempting to modify heat loss or absorption through these openings and thus conserve energy.

One general category of devices attempting to solve this problem has been the use of radiation barriers applied to window glazing in the form of special heat absorbing glasses or radiation reflective films applied to glass substrates.

The special heat absorbing glasses are relatively inefficient because much of the heat which they absorb is transferred to the interior areas either by conduction and convexion currents or by secondary radiation from the glass. Glass of this type is also relatively expensive to manufacture in that the oxides required to add the heat absorbing qualities to the glass do not melt homogenously and reproducably and thus glazing of a constant quality is not practically obtainable.

Solar radiation controlled by the application of reflective films to glass substrates has met with reasonable success in preventing solar energy from entering through windows but their use prevents solar energy from warming dwellings during cool seasons. For instance, Gelber in U.S. Pat. No. 3,990,784 on "Coated Architectural Glass System And Method" issued Nov. 9, 1976 teaches the concept of providing a plurality of thin films on a glass substrate which allow a reasonable amount of light transmittance while reflecting solar energy to shield a dwelling from its heating effect. Hunter in U.S. Pat. No. 3,977,930 on "Oil Based Adhesion Of Film To Window" issued Aug. 31, 1976; Franz in U.S. Pat. No. 3,935,351 on "Multiple Glazed Windows Including Selective Reflecting Metal/Metal Oxide Coatings" issued Jan. 21, 1976; and Mochel in U.S. Pat. No, 3,202,054 on "Radiation Filter With Plural Iridized Metal Oxide Films" issued Aug. 24, 1965 are further examples of the application of solar reflective films to glass substrates adapted to prevent solar radiation from entering dwellings. These devices are relatively efficient for their proposed use, that is preventing solar radiation from entering a dwelling and therefore they result in significant energy savings when utilized during the warmer seasons in structures that are air-conditioned. However, their use results in significant energy waste during the cooler seasons because they prevent solar radiation from heating the associated dwelling.

OBJECTIVES OF THE INVENTION

In view of the obvious inability of the prior art glazing systems to provide windows for dwellings which will minimize solar radiation heating of dwellings during warm seasons and permit solar radiation heating of dwellings during cool seasons, it is a primary objective of the present invention to provide a reversible glazing system which will reflect solar radiation in the summer and absorb solar radiation in the winter.

A still further objective of the present invention is to provide a glazing system including a thermal radiation absorptive film in direct contact with a reflective film adapted to permit heat absorbed by the absorptive film to be transferred to the reflective film via conductance from which it may be dissipated by thermal radiation and conduction to the surrounding atmosphere.

A further objective of the present invention is to provide a storm window in which the glazing may be conveniently reversed.

A still further objective of the present invention is to provide a glazing including a transparent glass substrate which will permit the passage of heat radiation but inhibit heat conductance in combination with a thin film coating of a heat conductive and absorptive material which is overcoated by a heat conductive and reflective material adapted to permit the collection of radiant heat energy from the glass substrate side and inhibit radiant energy transmission from the reflective side.

A still further objective of the present invention is to provide glazing units for triple track storm window systems which will provide a solar radiation shield in warm seasons and which may be reversed within the triple track frame to provide solar radiation collectors during the cold seasons.

SUMMARY OF THE INVENTION

Presented hereby is a glazing system comprised of a transparent glass substrate supporting a thin film of radiation absorptive, thermally conductive material which supports a radiation reflective, thermally conductive thin film. The three layer substrate functions to permit solar and heat radiation to pass through the glass substrate and be absorbed by the heat radiation absorptive layer. The glass substrate inhibits thermal conduction and therefore the heat absorbed in the heat absorptive layer is dissipated primarily through conduction to the reflective overlaying layer and subsequent secondary radiation and conductive transmission to the atmosphere. The solar radiation and heat radiation striking the reflective top layer of the substrate is reflective and thus prevented from reaching the other side of the substrate barrier. A portion of the radiation not reflected by the reflective layer is absorbed by the absorptive layer and reradiated into the atmosphere through the reflective layer via conduction and convexion of air currents.

The glazing system is incorporated in a framework compatible with the commonly employed and popular triple track storm/screen windows so that it may be utilized as a radiation barrier during summer months and a radiation collection during winter months through the simple process of reversing the framed glazing elements within the framework.

DESCRIPTION OF THE DRAWINGS

FIG. 1 is an edge view of the glazing system illustrating the glass substrate and two thin film layers.

FIG. 2 illustrates the glazing system in a triple track storm/screen window assembly.

FIG. 3 illustrates the front side of the window unit securing mechanism.

FIG. 4 illustrates the opposite side of the window unit securing mechanism.

FIG. 5 is an end, cutaway view of the window unit securing mechanism.

DESCRIPTION OF THE INVENTION

In its simplest form, the invention is based upon a glazing unit 10 similar to that illustrated in FIG. 1 which includes a transparent glass substrate 11 which may be ordinary window glass sheeting with a radiation absorbing film 12 deposited on one side. A second film layer 14 having reflective properties is deposited over the absorptive film 12 to form the basic sandwich structure of the invention.

The structure of FIG. 1 provides the environmental radiation control desired through the interaction of the three substrates 11, 12 and 14. Solar and thermal radiation will pass through the glass substrate 11 to be absorbed by film 12 but radiation originating on the other side of sheet will be reflected by film 14. Films 12 and 14 are heat conductive and the glass substrate 11 is relatively insulating. Therefore heat absorbed in flim 12 is dissipated primarily through conduction to film 14 which is free to radiate the heat and conduct the heat to the atmosphere. A small amount of heat is radiated through the glass substrate 11 as secondary radiation and a small percentage is transmitted via conduction through the glass but these percentages are relatively small with respect to the amount that is conducted through film 14 and radiated thereby.

The absorption of thermal radiation in a metal is due in part to free electrons and in part to bound electrons with one or the other being primary in certain regions of the spectrum. Free electron absoprtion in metallic aggregates is considerably higher than that in bulk metals because of the increased scattering at particle boundaries. This fact causes the interface between absorptive film 12 and reflective film 14 to be relatively absorptive as compared to reflective and therefore only the external surface of film 14 exhibits significant reflective properties in the assembly.

Film 12 may be comprised of any material which will absorb thermal radiation and conduct heat but in a preferred embodiment it is comprised of a metal base substrate.

In considering the materials for the absorptive film 12, the variation of absorption with film thickness must also be considered. Absorption variation due to thickness is dependent upon the degree of aggregation for wave lengths at which the absorption is mainly due to free electrons and of a much lower dependence for wave length regions where the effect of bound electrons dominates. For example, silver and aluminum exhibit a marked increase in absorption as the film thickness increases for all wave lengths while copper and gold films will show similar behavior only for wave lengths above 5500 angstroms. Antimony, nickel, palladium and chromium are similar to gold and copper in that their absorption reaction with respect to thickness is relatively low below 5500 angstroms.

The absorption versus thickness of a metallic film may be predicted in terms of the optical constance of the bulk metal according to Garnett's theory which is expressed below.

$$n'k' = \frac{3qb}{(1 - qa)^2 + 4q^2b^2} \quad (a)$$

$$k'^2 - n'^2 = 2 - \frac{3(1 - qa)}{(1 - qa)^2 + 4q^2b^2} \quad (b)$$

$$a = \frac{(k^2 - n^2 - 1)(k^2 - n^2 - 2) + 4n^2k^2}{(k^2 - n^2 - 2)^2 + 4n^2k^2} \quad (c)$$

$$b = \frac{3nk}{(k^2 - n^2 - 2)^2 + 4n^2k^2} \quad (d)$$

Differentiation of equation (a) indicates that a curve of n'k' vs. q (which increases with film thickness) processes a maximum if $a^2 + 4b^2$ is less than 1.

From equations (c) and (d), this corresponds to k being less than 0 where $K=[2(k^2-n^2)^3-9] [k^2-n^2)^2+(12+8n^2k^2) (k^2-n)-(4+12n^2k^2)]$ Thus if $k>0$ a maximum will be observed but when $k<0$ no maxima are observed.

The preceding formulas, used in conjuction with the standard values of n and k for the wavelengths concerned and the metals of interest as derived from standard tables of the proporties of metallic films such as those contained in the "American Institute of Physics Handbook", or any of the commonly accepted techniques may be used to determine the optimum film thickness for the absorptive film layer 12. For instance, if one were to consider a black nickel film with respect to absorption of radiation in the frequency range of 6000 angstroms it would be seen that maximum absorption is approached but not obtained by a film 400 angstroms thick and 75% of maximum is obtained from a film thickness of 200 angstroms.

The reflecting film 14 may be any of a wide variety of reflecting metallic films ideally deposited in an optical thickness one-quarter wavelength at the wavelength at which the highest reflectance is required. A further consideration is that the refractive index of the film 14 should exceed that of the substrate 12 upon which it is deposited for maximum efficiency. If these conditions are held, beams reflected from the air/film interface and the film/substrate interface through film 14 will be in phase and maximum reflectance will be experienced and absorption of radiation through substate 12 at the substrate/film interface will be maintained.

The higher the refractive index of the film, the greater its reflectance. This may be calculated by the following, where reflectance R at wavelength λ of a surface of refractive index $n_2$ is covered by a quarter wavelength film of index $n_1$ $$R = \frac{n_0 n_2 - n^2_1}{n_0 n_2 + n^2_1}$$

By way of example, if absorptive layer 12 is selected from a metal having a refractive index of 1.50 then the following film materials will have the indicated reflectance.

| Film Material | Refractive Index | Wavelength | Reflectance |
| --- | --- | --- | --- |
| ZnS | 2.30 | 5461 A | 0.— |
| TiO$_2$ | 2.6 | 5461 A | 0.40 |
| Sb$_2$S$_3$ | 2.7 | 1μ | 0.43 |
| Ge | 4.0 | 2μ | 0.69 |
| Te | 5.0 | 4μ | 0.79 |

In selecting the materials for the absorptive film 12, it is therefore important that every effort should be made to utilize a material which has a relatively high absorption factor for a relatively thin film and a low refractive index. The reflective film 14 should be a quarter wavelength thick and of a material which has a high refractive index. The optical constances k and n should be taken into consideration at the critical wavelength to select the optimum materials for substrates 12 and 14, realizing however that the optimum selection may not be practical for economic and supply reasons.

An adequate compromise in substrate material selection has been obtained by the electrolysis deposition of a black nickel film on a glass substrate 11 to create the absorptive film 12 and the electroplating of a bright nickel film thereon to create the reflective film 14.

The optimized glazing element 10 comprised of glass substrate 11, absorption film 12 and reflective film 14 is installed in a window frame similar to that illustrated in FIG. 2. This is a typical, three track aluminum storm window having a support frame 20 which is secured to the exterior of a dwelling. The frame is adapted to hold two window panes 10 in frames 16 and 18. Each window frame is identical in that it includes the glazing sheet 10 incorporating the absorption and reflective films and upper supporting pivot pins 22 which fit within one of the tracks 24 of the support frame 20. The lower corners of the window frame 16 incorporates spring biased locking means which also fit within track 24 to secure the window within the framework 20. Window frame 18 is identical to window frame 16 with respect to the upper support pins 22 and lower locking means 26.

FIG. 3 illustrates in more detail a preferred embodiment of the lower support means of window frame 16. The lower support means 26 includes an actuation bar 30 which in a preferred embodiment is recessed so that it is flush with frame 16 so that it will not interfere with window frame 18 when the windows are slid past each other. A recess 32 is provided within the frame 16 to permit the actuating pin 30 to be manipulated by a persons finger. Bias spring 28 is incorporated in a bore within the framework to urge the support bar 26 into the frame channel.

FIG. 4 is a view of the opposite side of the support bar mechanism illustrated in FIG. 3. On this side of the support bar a pin 34 is provided to enable actuation of the bar and a slot 36 is included in the framework to permit the pin to be drawn to the left to retract the support rod. In a preferred embodiment pin 34 is recessed within the frame so that it will not interfere with the other window frame and opening 36 is large enough to permit an operators finger to engage the recessed actuating means 34.

FIG. 5 is a cutaway view of the bottom support mechanism wherein actuating means 30 and 34 are illustrated in an alternate embodiment where they include threaded shafts which cooperate with threaded bores in the support bar 26. In this embodiment slot openings 32 and 36 in the window frame 16 are relatively small and the actuating pins 30 or 34 which will interfere with the adjacent window operation must be removed by unscrewing them.

Actuation means for the lower support and locking pins 26 are provided on both sides of the windows so that the window frames may be removed and reversed to permit the window unit to provide reflective functions during the warm months and absorption functions during the cool months.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:
1. A glazing assembly, comprising:
   a thermally insulating glass substrate;
   a radiation absorption film comprised of a thermally conductive material affixed to one surface of said glass substrate; and
   a radiation reflective film comprised of a thermally conductive material with one surface exposed to the atmosphere and an opposite surface secured to the surface of said radiation absorption film opposite said glass substrate whereby radiation absorbed by said radiation absorption film as heat is conducted to said radiation reflective film and radiated therefrom.
2. An apparatus as defined in claim 1 wherein said radiation is in a range between 400 and 1400 angstroms.
3. An apparatus as defined in claim 1 wherein said radiation absorptive film is black nickel and said radiation reflective film is bright nickel.
4. An apparatus as defined in claim 1 wherein said radiation absorptive film is applied to said glass substrate by an electrolysis deposition method and said radiation reflective film is electroplated thereon.
5. An apparatus as defined in claim 1 further comprising:
   a window frame supporting the edges of said glass substrate;
   first and second protrusions extending outwardly from said window frame at opposite sides thereof adjacent to a common perpendicular side; and first and second spring biased protrusions projecting from said opposite sides of said window frame and adjacent to a second perpendicular side.
6. An apparatus as defined in claim 5 wherein first and second recesses are provided in said opposite sides of said window frame dimensioned to permit said spring biased protrusions to be urged within said window frame boundaries.
7. An apparatus as defined in claim 6 further comprising a rectangular framework incorporating an inner channel dimensioned to receive said protrusions and spring biased protrusions for slidably supporting said glass substrate so that said radiation reflective film may selectively be placed to face in or out.
8. An apparatus as defined in claim 7 wherein said channel includes a plurality of recesses adapted to cooperate with said spring biased protrusions for securing said window frame in various positions along said channels.
9. An apparatus as defined in claim 1 wherein said glass substrate is contained within a window frame adapted to permit the removable installation within a dwelling so that said radiation reflective film may be alternated between the exterior and interior of said dwelling as a function of climatic seasons.

* * * * *